(12) United States Patent
Geyer

(10) Patent No.: US 12,027,033 B2
(45) Date of Patent: Jul. 2, 2024

(54) WEARABLE PERSONAL SAFETY DEVICES AND METHODS OF OPERATING THE SAME

(71) Applicant: Guardian Band, Inc., Cary, NC (US)

(72) Inventor: Lisa Geyer, Cary, NC (US)

(73) Assignee: Guardian Band Inc., Cary, NC (US)

( * ) Notice: Subject to any disclaimer, the term of this patent is extended or adjusted under 35 U.S.C. 154(b) by 0 days.

(21) Appl. No.: 16/003,454

(22) Filed: Jun. 8, 2018

(65) Prior Publication Data
US 2018/0357887 A1 Dec. 13, 2018

Related U.S. Application Data

(60) Provisional application No. 62/516,902, filed on Jun. 8, 2017.

(51) Int. Cl.
| | |
|---|---|
| *G08B 25/01* | (2006.01) |
| *G08B 21/02* | (2006.01) |
| *G08B 21/04* | (2006.01) |
| *H04B 1/3827* | (2015.01) |
| *H04N 7/04* | (2006.01) |
| *H04W 84/04* | (2009.01) |

(52) U.S. Cl.
CPC ....... *G08B 25/016* (2013.01); *G08B 21/0297* (2013.01); *G08B 21/0446* (2013.01); *G08B 21/0453* (2013.01); *G08B 21/0469* (2013.01); *G08B 21/0476* (2013.01); *H04B 1/385* (2013.01); *H04N 7/04* (2013.01); *H04W 84/042* (2013.01)

(58) Field of Classification Search
CPC .............. G08B 25/016; G08B 21/0297; G08B 21/0446; G08B 21/0453; G08B 21/0469; G08B 21/0476; H04B 1/385; H04W 84/042
USPC ..................................................... 340/539.11
See application file for complete search history.

(56) References Cited

U.S. PATENT DOCUMENTS

| | | | | |
|---|---|---|---|---|
| 6,411,207 | B2 * | 6/2002 | Shaffer | G08B 7/06 340/521 |
| 8,538,374 | B1 * | 9/2013 | Haimo | G01S 19/17 455/404.2 |
| 9,477,823 | B1 * | 10/2016 | Ott | G06F 21/316 |
| 9,697,721 | B1 * | 7/2017 | Akuoku | G08B 15/00 |

(Continued)

OTHER PUBLICATIONS

PCT Invitation to Pay Additional Fees, including Partial International Search Report for corresponding International Application No. PCT/US2018/036644 (12 pages).

*Primary Examiner* — Kerri L McNally
*Assistant Examiner* — Thang D Tran
(74) *Attorney, Agent, or Firm* — Boris Leschinsky

(57) ABSTRACT

A method includes detecting an event at a wearable mobile device, generating an alert in response to the event, and transmitting the alert over a communication path that comprises a cellular network. The wearable mobile device, such as a watch, necklace, bracelet, and the like, includes a safety module/application. The safety module/application may incorporate both event detection via one or more sensing or recordation modules and notification functionality. Emergency contacts, including public safety organizations, family members, friends, and the like may be notified in a variety of ways based on the particular event that is detected.

3 Claims, 8 Drawing Sheets

(56) References Cited

U.S. PATENT DOCUMENTS

| | | | | |
|---|---|---|---|---|
| 9,953,650 B1* | 4/2018 | Falevsky | | G10L 15/22 |
| 2001/0050612 A1* | 12/2001 | Shaffer | | G08B 21/14 |
| | | | | 340/521 |
| 2002/0122113 A1* | 9/2002 | Foote | | G06T 3/4038 |
| | | | | 348/48 |
| 2004/0143602 A1* | 7/2004 | Ruiz | | G08B 13/122 |
| | | | | 348/E7.086 |
| 2004/0162067 A1* | 8/2004 | Stefani | | G08B 13/1966 |
| | | | | 455/431 |
| 2005/0068171 A1* | 3/2005 | Kelliher | | G08B 21/0269 |
| | | | | 340/539.22 |
| 2005/0068183 A1* | 3/2005 | Yuasa | | A01K 29/00 |
| | | | | 340/573.1 |
| 2007/0102527 A1* | 5/2007 | Eubank | | G08B 25/006 |
| | | | | 235/492 |
| 2008/0255431 A1* | 10/2008 | Erad | | G08B 21/12 |
| | | | | 600/301 |
| 2011/0130636 A1* | 6/2011 | Daniel | | G08B 25/016 |
| | | | | 600/301 |
| 2012/0127306 A1* | 5/2012 | Oh | | G06V 40/113 |
| | | | | 348/143 |
| 2012/0162423 A1* | 6/2012 | Xiao | | H04N 7/181 |
| | | | | 348/148 |
| 2013/0040596 A1* | 2/2013 | Paim | | H04W 4/90 |
| | | | | 455/404.1 |
| 2013/0040600 A1* | 2/2013 | Reitnour | | H04W 4/90 |
| | | | | 455/404.2 |
| 2013/0260825 A1* | 10/2013 | Hagenstad | | G08B 15/004 |
| | | | | 455/556.1 |
| 2013/0278414 A1* | 10/2013 | Sprigg | | A61B 5/746 |
| | | | | 340/539.12 |
| 2014/0095420 A1* | 4/2014 | Chun | | G16H 40/67 |
| | | | | 706/46 |
| 2014/0143328 A1* | 5/2014 | Miller | | H04L 65/403 |
| | | | | 709/204 |
| 2014/0220855 A1* | 8/2014 | Heilbron | | A63H 3/006 |
| | | | | 446/175 |
| 2014/0266691 A1* | 9/2014 | McKinley | | G08B 25/016 |
| | | | | 340/539.11 |
| 2014/0266705 A1* | 9/2014 | McKinley | | G08B 25/10 |
| | | | | 340/539.13 |
| 2014/0340216 A1* | 11/2014 | Puskarich | | G08B 17/11 |
| | | | | 340/539.11 |
| 2014/0379258 A1* | 12/2014 | Beaurepaire | | G01C 21/3415 |
| | | | | 701/533 |
| 2015/0009282 A1* | 1/2015 | Mai | | H04N 7/147 |
| | | | | 348/14.12 |
| 2015/0065082 A1* | 3/2015 | Sehgal | | G08B 25/016 |
| | | | | 455/404.2 |
| 2015/0213708 A1 | 7/2015 | Barzangi | | |
| 2015/0223271 A1 | 8/2015 | Penix | | |
| 2015/0342542 A1* | 12/2015 | An | | A61B 5/747 |
| | | | | 455/404.2 |
| 2016/0050037 A1* | 2/2016 | Webb | | G08B 27/005 |
| | | | | 455/3.01 |
| 2016/0050305 A1* | 2/2016 | Lee | | H04M 1/6041 |
| | | | | 455/563 |
| 2016/0071392 A1* | 3/2016 | Hankey | | G08B 21/0446 |
| | | | | 340/573.1 |
| 2016/0110990 A1* | 4/2016 | Cruver | | H04W 4/90 |
| | | | | 340/573.1 |
| 2016/0174025 A1* | 6/2016 | Chaudhri | | H04B 1/385 |
| | | | | 455/41.1 |
| 2016/0180697 A1* | 6/2016 | Ros | | G08B 25/016 |
| | | | | 340/539.11 |
| 2016/0210838 A1* | 7/2016 | Yan | | G08B 21/043 |
| 2016/0270126 A1* | 9/2016 | Adams | | H04W 4/90 |
| 2016/0283014 A1* | 9/2016 | Rider | | G06F 1/1652 |
| 2016/0286156 A1* | 9/2016 | Kovac | | G06Q 50/26 |
| 2017/0012972 A1* | 1/2017 | Tanaka | | G06F 1/163 |
| 2017/0048648 A1* | 2/2017 | Lee | | H04W 4/70 |
| 2017/0127257 A1* | 5/2017 | Saxena | | H04W 4/023 |
| 2017/0169686 A1* | 6/2017 | Skorpik | | G08B 21/02 |
| 2017/0301220 A1* | 10/2017 | Jarrell | | H04W 4/70 |
| 2017/0371339 A1* | 12/2017 | Charette | | B60W 30/0956 |
| 2018/0006431 A1* | 1/2018 | Winer | | G06T 7/50 |
| 2018/0190094 A1* | 7/2018 | Gill | | G08B 25/016 |

* cited by examiner

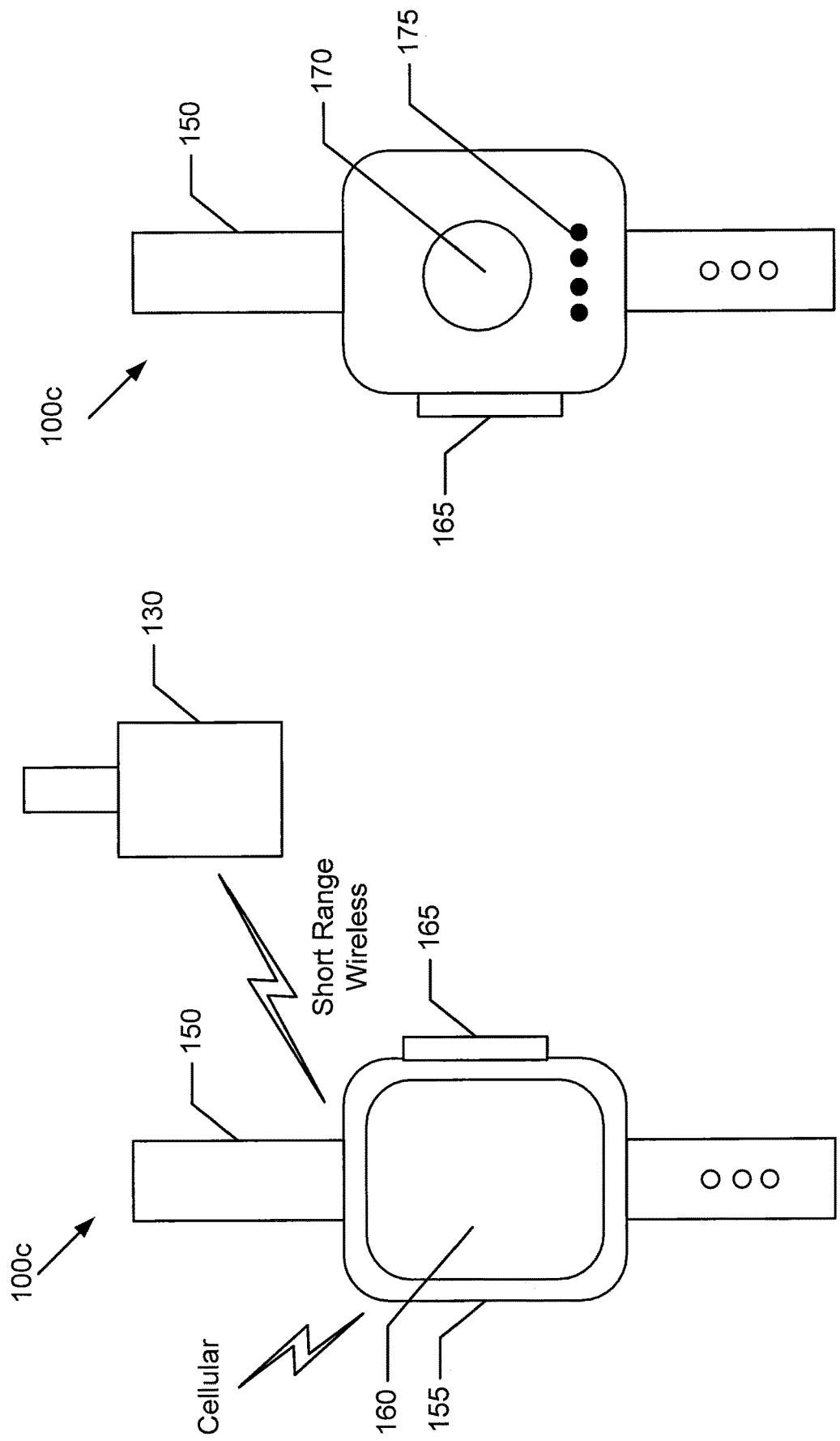

WEARABLE PERSONAL SAFETY DEVICES AND METHODS OF OPERATING THE SAME

CROSS REFERENCE TO RELATED APPLICATION

The present application claims priority to U.S. Provisional Patent Application Ser. No. 62/516,902, filed Jun. 8, 2017, the entire content of which is incorporated by reference herein as if set forth in its entirety.

BACKGROUND

The present disclosure relates to personal safety, and, in particular, to wireless personal safety devices, systems, and methods.

Personal Emergency Response Systems (PERS), also known as Medical Emergency Response Systems, let you call for help in an emergency by pushing a button. A PERS typically has three components: a small radio transmitter, a console connected to a telephone, and an emergency response center that monitors calls. The radio transmitter is typically worn around the neck, on the wrist, on a belt, or in a pocket. When a person needs help, the transmitter's help button is pressed, which sends a signal to the console. The console automatically dials one or more emergency telephone numbers. Many PERS are programmed to telephone an emergency response center. The emergency response center will try to find out the nature of the emergency and may also review the person's medical history and check who should be notified. Conventional PERS are generally used in a residential setting in proximity to the person's console and telephone.

SUMMARY

In some embodiments of the inventive subject matter, a method comprises detecting an event at a wearable mobile device, generating an alert in response to the event, and transmitting the alert over a communication path that includes a cellular network.

In other embodiments, detecting the event comprises detecting an invocation of a hard key and/or soft key on the wearable mobile device.

In still other embodiments, the wearable mobile device comprises a clasp mechanism having a connected state and an unconnected state. Detecting the event comprises detecting a transition of the clasp mechanism from the connected state to the unconnected state.

In still other embodiments, detecting the event comprises receiving at least one of acceleration information and orientation information for the wearable mobile device, comparing the at least one of acceleration information and orientation information to a threshold to generate a comparison result, and detecting the event based on the comparison result.

In still other embodiments, detecting the event comprises receiving environmental information and detecting the event based on the environmental information.

In still other embodiments, the environmental information comprises visual information captured by a camera or a video recorder.

In still other embodiments, the environmental information comprises audio information captured by a microphone.

In still other embodiments, detecting the event comprises detecting an obstruction of a camera or a video recorder and determining that a time duration of the obstruction exceeds a threshold.

In still other embodiments, detecting the event comprises defining a bounded geographic area and detecting that the wearable mobile device has transitioned from inside the bounded geographic area to outside the bounded geographic area.

In still other embodiments, detecting the event comprises receiving biometric information corresponding to a person wearing the wearable mobile device via a biometric sensor associated with the wearable mobile device and detecting the event based on the biometric information.

In still other embodiments, transmitting the alert comprises transmitting audio and/or video information over the communication path to a security information repository.

In still other embodiments, transmitting the alert comprises transmitting the alert to at least one defined emergency contact.

In still other embodiments, the alert comprises at least one of audio information, video information, and text information.

In still other embodiments, transmitting the alert comprises streaming at least one of audio and video information to the at least one defined emergency contact.

In still other embodiments, transmitting the alert comprises transmitting location information corresponding to the wearable mobile device.

In still other embodiments, the location information comprises Global Positioning System (GPS) information.

In still other embodiments, the method further comprises providing a remote entity with access to a camera, video recorder, microphone, and/or speaker of the wearable mobile device over the communication path responsive to detecting the event.

In still other embodiments, the method further comprises changing a light color emitted by the wearable mobile device responsive to detecting the event.

In still other embodiments, the light color is associated with an identification protocol.

In still other embodiments, the method further comprises strobing a light emitted by the wearable mobile device responsive to detecting the event.

In still other embodiments, the method further comprises generating an audible alarm responsive to detecting the event.

In still other embodiments, the wearable mobile device is a watch, a necklace, a bracelet, a fitness tracker, or eyeglasses.

In further embodiments of the inventive subject matter, an electronic device comprises a wearable mobile device and an attachment mechanism configured to facilitate carriage of the wearable device on a human. The wearable mobile device comprises a processor and a memory coupled to the processor and comprising computer readable program code embodied in the memory that is executable by the processor to perform operations comprising: detecting an event, generating an alert in response to the event, and transmitting the alert over a communication path that includes a cellular network.

In further embodiments of the inventive subject matter, the wearable mobile device is a watch that comprises a body having a slot formed in an end thereof. The attachment mechanism comprises a band having an end that is configured to be slidably received within the slot for attachment therein.

In other embodiments of the inventive subject matter, a computer program product comprises a tangible computer readable storage medium comprising computer readable program code embodied in the medium that is executable by a processor to perform operations comprising: detecting an event at a wearable mobile device, generating an alert in response to the event, and transmitting the alert over a communication path that includes a cellular network.

It is noted that aspects described with respect to one embodiment may be incorporated in different embodiments although not specifically described relative thereto. That is, all embodiments and/or features of any embodiments can be combined in any way and/or combination. Moreover, other methods, systems, devices, articles of manufacture, and/or computer program products according to embodiments of the inventive subject matter will be or become apparent to one with skill in the art upon review of the following drawings and detailed description. It is intended that all such additional methods, systems, devices, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 1A, 1B, 1C, 1D, and 1E are diagrams of wearable mobile devices according to some embodiments of the inventive subject matter.

DETAILED DESCRIPTION

Figure 1A:
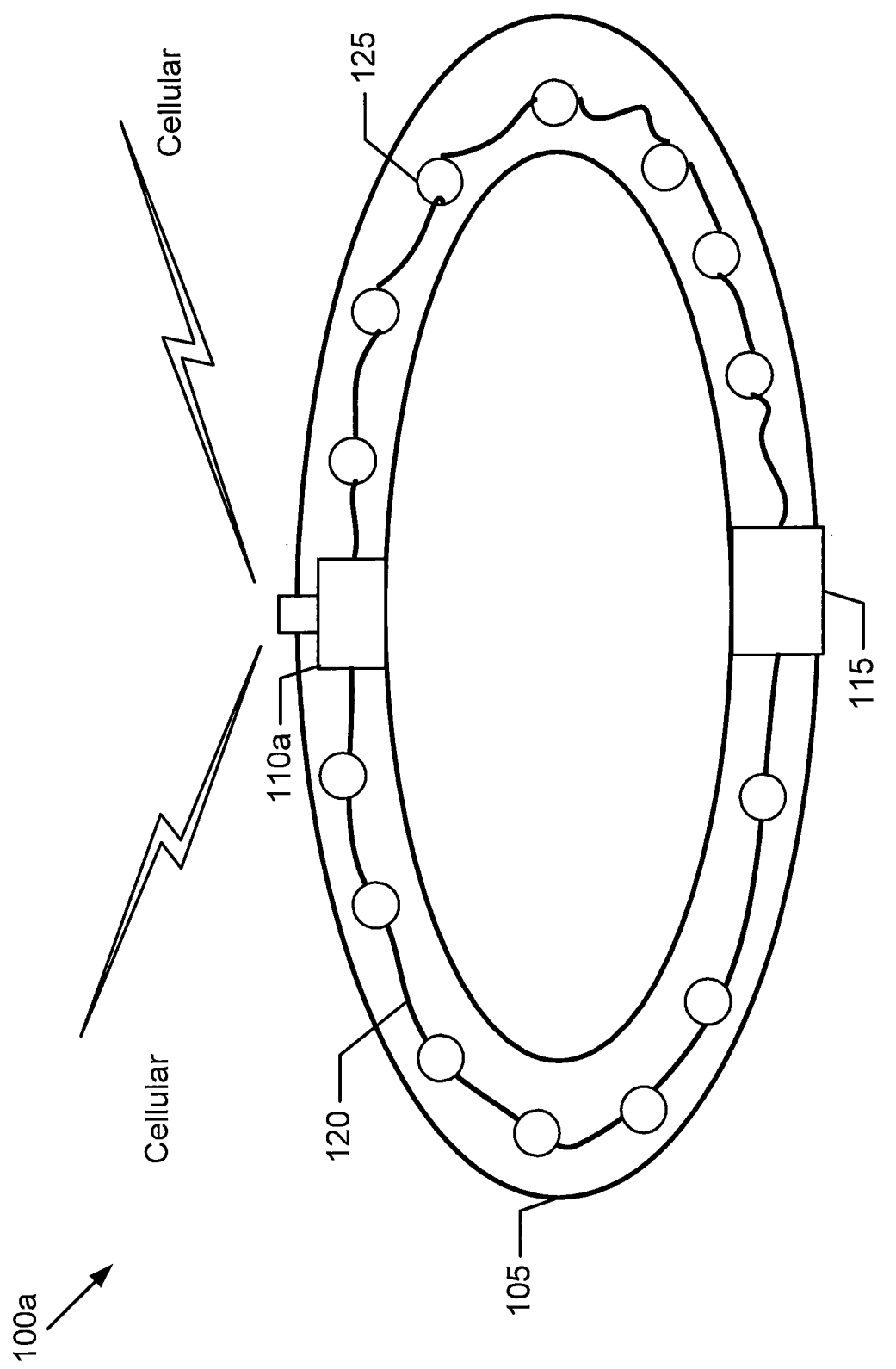

In the following detailed description, numerous specific details are set forth to provide a thorough understanding of embodiments of the present disclosure. However, it will be understood by those skilled in the art that embodiments of the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, the term "data processing facility" includes, but is not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices. Mobile terminals or mobile devices may also encompass wearable technology, wearables, fashionable technology, wearable devices, tech togs, and/or fashion electronics, which are smart electronic devices (i.e., electronic device with microcontroller) that can be worn on the body, implanted in the body, and/or as an accessory to other clothing. The designs often incorporate practical functions and features. Wearable devices may include, but are not limited to, necklaces, bracelets, head sets, headphones, fitness tracker devices, sleep tracker devices, navigation devices, watches, eyeglasses, and ear pieces. In addition, mobile terminals or mobile devices may also encompass vehicular apparatus including, but not limited to, automobiles, trucks, buses, trains, and planes.

For purposes of illustration, embodiments of the present invention are described herein in the context of a wearable mobile terminal or wearable mobile device. It will be understood, however, that the present invention is not limited to such embodiments and may be embodied generally as a mobile electronic device that is configured to transmit, receive, and/or process text, images, video, and/or audio information in response to an event, such as activation by a user, irregular movement of the device, or the like.

Some embodiments of the inventive subject matter provide a wearable mobile device, such as a watch, ring-shaped necklace, bracelet, eyeglasses, or the like that includes an integrated live-streaming video transmission mechanism that is configured to generate and communicate an alert across over a communication path that includes a cellular in response to an event. The event may be, for example, but not limited to invocation of an emergency hard or soft key, irregular movement of the wearable device, unwanted breaking the connection of a clasp or other mechanism used to secure the wearable device to a person wearing it. The alert may include transmission of continuous audio/video feed to a security monitoring server. In other embodiments, the alert may involve the transmission of image information, audio information, video information, and/or text information to one or more recipients that a user has identified on a contact list. These recipients may include, for example, a security service or public safety organizations. For example, a wearable device, such as a necklace may include a clasp having matable engagement elements that when disengaged from one another actuate an alarm output that may be visual (e.g., an LED array arranged to provide a color change of the neck ring from a "normal" color, to an alarm color), sonic, and/or silent (transmitted to a security monitoring center, to an amber alert system, to a predetermined contact list of recipients, etc.). The clasp disengagement alarming capability may be deactivated to permit removal of the necklace without audio, visual, or silent alarming, by user input to an associated computer, tablet, smartphone, etc., to accommodate normal removal of the necklace. The clasp-disengagement alarming capability may be configured so that it can be deactivated to permit removal of the neck ring without audio or visual alarming. The necklace may be fabricated so that it is compactable to fit in a small case, e.g., a glasses case, makeup case, or the like. It may also be packaged for vending machine supply, e.g., from dispensers in restrooms, campus centers, nursing homes, and the like. It may also be suitably packaged, for distribution at day camps, to persons taking walking tours, in freshman orientation packages at colleges, at city and state visitor's centers, etc. The necklace may also be configured to provide identification for taxis, rideshare services, buses, and other modes of transportation, such as by a light component that is activated so that the necklace emits a "healing light" of a specific color that is recognized by the vehicle operator to elicit identification of a prospective passenger. The color could be associated with a lighting system on the vehicle that emits light of a similar color for bidirectional identification by both the vehicle operator and the prospective passenger. A watch is another example of a wearable device that may include the features described above with respect to a necklace. The watch may further include, for example, a biometric sensor that can be used for both fitness tracking and to monitor a person's breathing and heartbeat. Should these vitals for an individual fall outside of a healthy range, an alert may be generated as described above to notify emergency personnel that may come to the person's aid. A wearable mobile device, such as a watch or necklace may further include a capability of generating an alert as described above should a person travel outside of a defined boundary based on GPS information, for example This could be used to provide help and assistance to children or elderly individuals should they wander outside a defined safe area. The wearable mobile device may also provide a capability for a remote entity to have access to capabilities, such as a camera, video recorder, speaker, microphone or the like to see the environment surrounding the person who is wearing the device. This may be helpful if a person is in a dangerous situation and cannot speak or communicate to describe the surrounding environment and events.

FIG. 1A is a diagram of a wearable mobile device 100a according to some embodiments of the inventive subject matter. The wearable mobile device 100a may be embodied, for example, as a necklace. It will be understood, however, that the wearable mobile device 100a may be embodied in numerous other types of wearable devices, such as a bracelet, watch, head set, eyeglasses, and the like as described above in accordance with other embodiments of the inventive subject matter. The wearable mobile device 100a comprises a necklace framework 105 that includes a mobile device 110a and a clasp 115. The mobile device 110a may be equipped with cellular radio frequency technology to allow the mobile device 110a to communicate with other devices using cellular wireless networks. The wearable mobile device 100a may further comprise one or more light emitting devices 125 interspersed and electrically connected through one or more wires 120 throughout the necklace framework 105. The light emitting devices 125 may be devices, such as Light Emitting Diodes (LEDs), which can be configured to emit a particular color responsive to a signal from the mobile device 110a. The clasp 115 may be used to open and close the wearable mobile device 100a and may be communicatively coupled to the mobile device 110a allowing the mobile device 110a to detect whether the clasp 115 is in an open or closed state. In some embodiments, the clasp 115 may include one or more electrical switches.

Figure 1B:
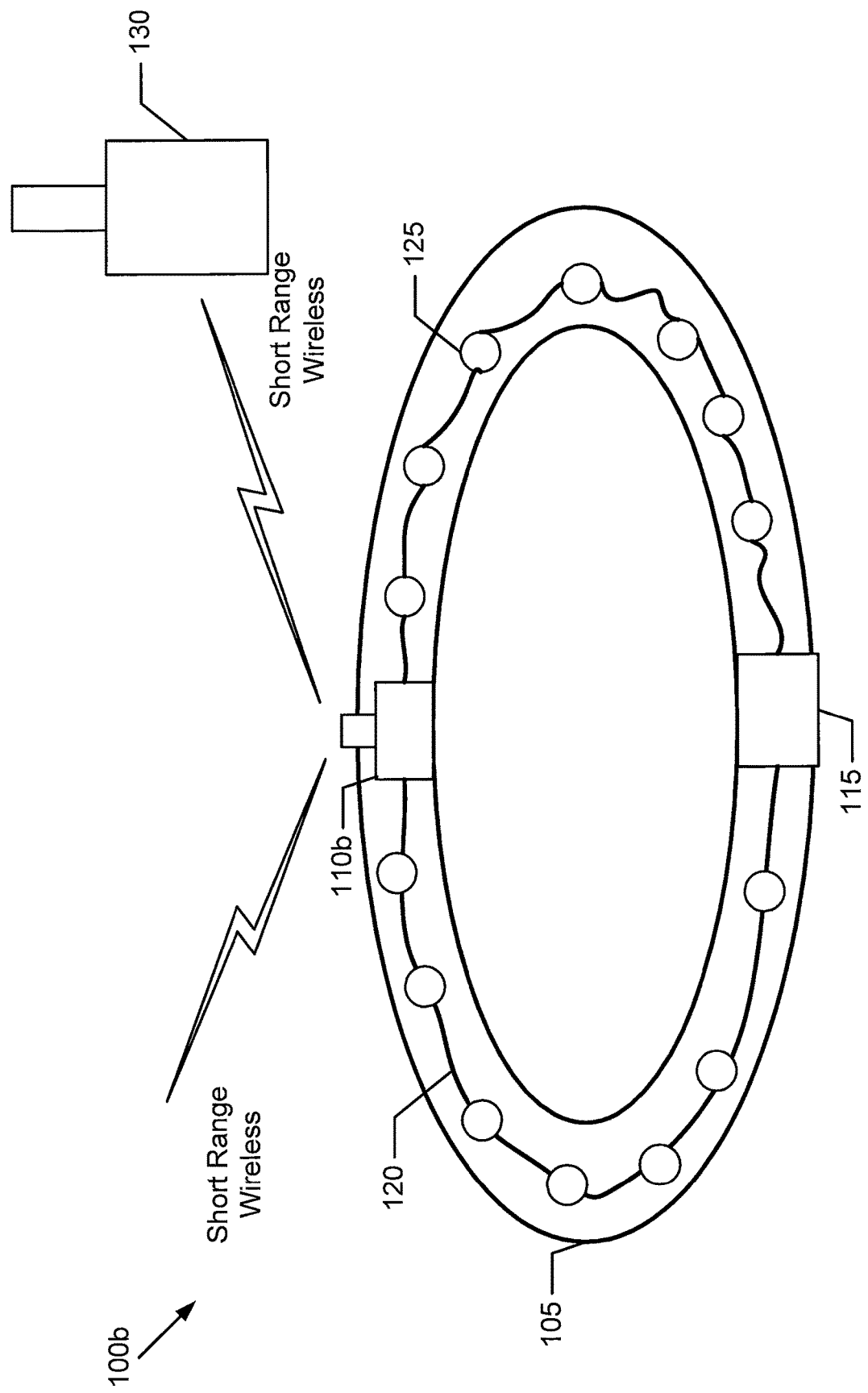

FIG. 1B is a diagram of a wearable mobile device 100b according to some embodiments of the inventive subject matter. The wearable mobile device 100b is similar to the wearable mobile device 100a with the exception that the mobile device 110b is not equipped with cellular radio frequency technology, but is instead equipped with direct point-to-point short-range wireless technology, such as the Classic Bluetooth protocol, Bluetooth Low Energy protocol, Wireless Local Area Network (WLAN) protocol, ZigBee protocol, Infrared protocol, Device to Device (D2D) cellular, the Wi-Fi protocol, and/or other short-range wireless technology protocols. The mobile device 110b may be configured to use the short-range wireless technology to communicate with a supplemental or secondary mobile device 130, which may in turn be equipped with cellular radio frequency technology for communicating over one or more cellular wireless networks.

FIG. 1C is a plan view diagram of a wearable mobile device 100c according to some embodiments of the inventive subject matter. The wearable mobile device 100c may be embodied, for example, as a watch. The wearable mobile device 100c may include a band 150 and a watch body 155 with the watch body having a display 160 thereon. The watch body 155 may be a smart watch and may be equipped with cellular radio frequency technology to allow the wearable mobile device 100c to communicate with other devices using cellular wireless networks. As shown in FIG. 1C, the wearable mobile device 100c may also be equipped with direct point-to-point short-range wireless technology, such as the Classic Bluetooth protocol, Bluetooth Low Energy protocol, Wireless Local Area Network (WLAN) protocol, ZigBee protocol, Infrared protocol, Device to Device (D2D) cellular, the Wi-Fi protocol, and/or other short-range wireless technology protocols. The wearable mobile device 100c may be configured to use the short-range wireless technology to communicate with a supplemental or secondary mobile device 130, which may in turn be equipped with cellular radio frequency technology for communicating over one or more cellular wireless networks. The wearable mobile device 100c may include an emergency button 165 that can be invoked by a user as an event to initiate generation of an alert in response thereto.

FIG. 1D is a plan view diagram that illustrates the back side of the wearable mobile device 100c, opposite the display 160, which includes a biometric sensor 170 and charging ports 175 for recharging the battery of the wearable mobile device 100c. The biometric sensor 170 may provide biometric information, such as heart rate, and other vitals, that can be used in fitness applications and also as a basis for identifying an event for which an alert may be generated.

Figure 1E:
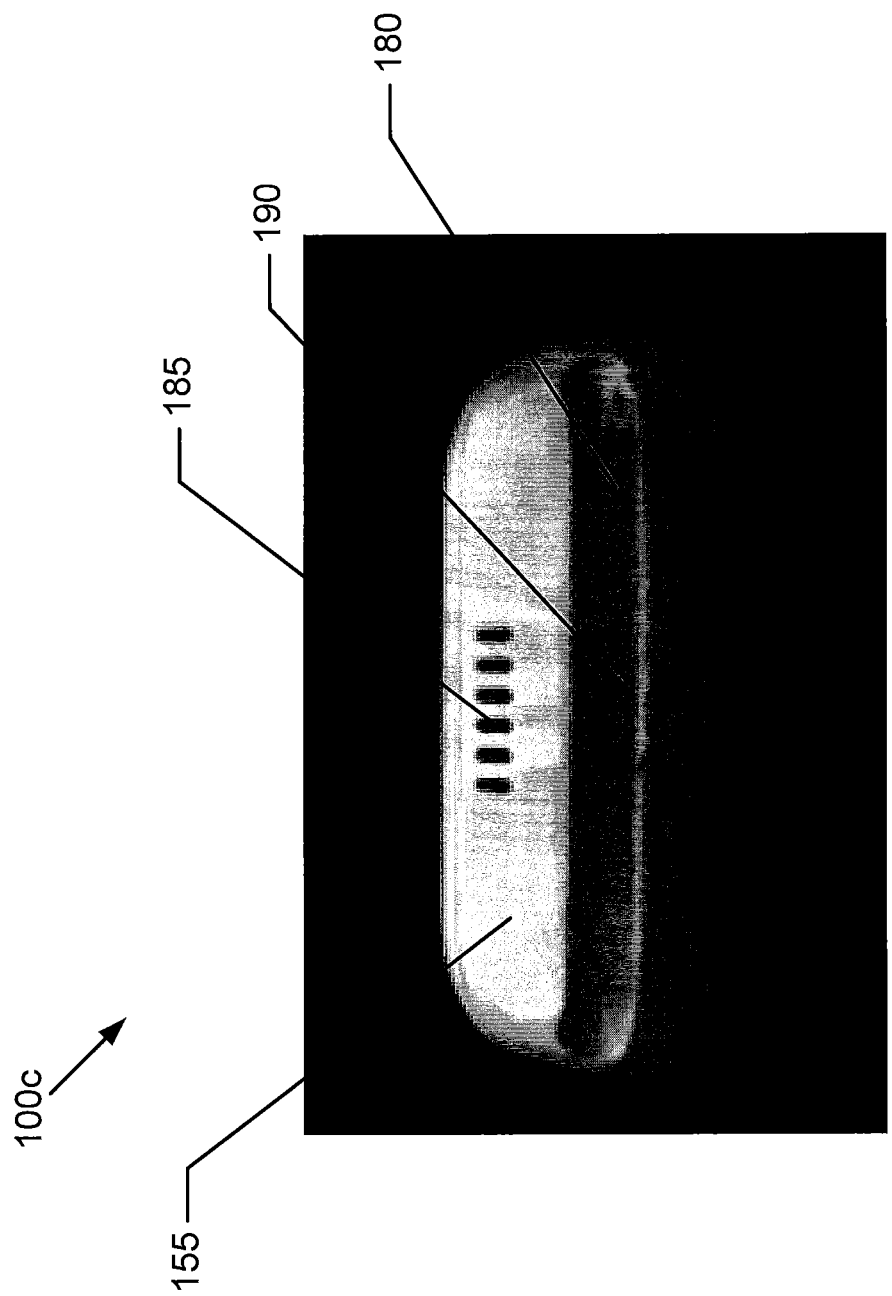

FIG. 1E is an elevation view diagram that illustrates an end of the watch body 155. The watch body 155 may include a slot 180 formed therein to receive an end of the band 150 therethrough. The slot 180 may include a single opening 190 therein for securing the band 150 in the slot 180. The band 150 can be removed by inserting, for example, a paper clip or other suitable apparatus in the slot 180 and dislodging the band 150 from the connection with the opening 190. The watch body 155 may further include openings 185 for a microphone and/or speaker.

Figure 2:
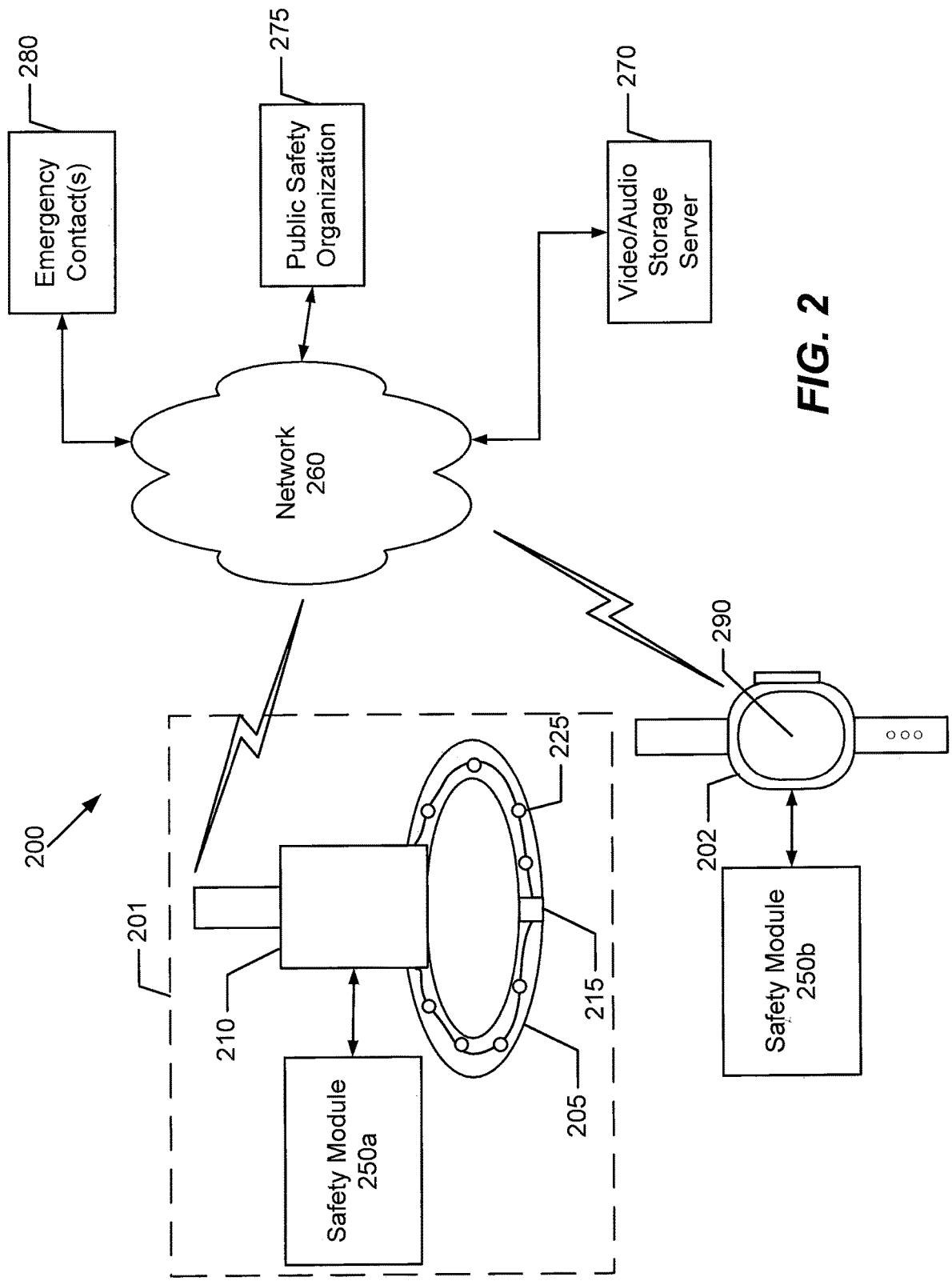
FIG. 2 is a block diagram of a communication network for facilitating communication of image information, audio information, video information, and/or text information in response to an event in accordance with some embodiments of the inventive subject matter.

FIG. 2 is a block diagram of a communication network 200 for facilitating communication of image information, audio information, video information, and/or text information in response to an event in accordance with some embodiments of the inventive subject matter. As shown in FIG. 2, a user may be associated with a wearable mobile device 201, such as the wearable mobile device 100a of FIG. 1A or 100b of FIG. 1B, that comprises a necklace framework 205, mobile device 210, clasp 215, and light emitting devices 225 and/or a wearable mobile device 202, such as the wearable mobile device 100c of FIGS. 1D, 1D, and 1E. The wearable mobile devices 201 and 202 may be embodied with cellular technology as described with respect to wearable mobile device 100a and 100c and/or short-range wireless technology as described with respect to wearable mobile device 100b and 100c. When the wearable mobile devices 201 and 202 are embodied without including the cellular technology as described with respect to wearable mobile devices 100b and 100c, then the wearable mobile devices 201 and 202 may be used in conjunction with a secondary mobile device, such as mobile device 130 (FIG. 1B), to provide access to one or more cellular wireless networks.

The wearable mobile devices 201 and 202 may be configured with safety modules 250a, 250b, respectively, that may provide functionality to collect and/or transmit image information, audio information, video information, and/or text information in response to an event. The event may be the user activating a hard switch, button, or soft switch on the wearable mobile device 201, 202 or another device that is communicatively coupled (e.g., short-range wireless connection) to the wearable mobile device 201, 202, such as the user's cellular phone. An event may also correspond to the clasp 215 being opened in various ways. For example, the user may open the clasp intentionally, another person may forcibly open the clasp against the user's will, an accident, such as a fall or impact, may result in the clasp breaking open, and the like. Upon the detection of an event, the safety modules 250a and 250b may be configured to communicate various information to various parties or entities. For example, in some embodiments, the wearable mobile devices 201 and 202 may generate, record, and/or transmit image information, audio information, video information, and/or text information to a remote location, such as the video/audio storage server 270 over the network 260. The safety modules 250a and 250b may also be configured to communicate with various entities that the user may be in distress. For example, a Short Message Service (SMS) message, email, or phone call may be originated to a public safety organization 275, such as the police, fire department, ambulance, and the like, and/or to one or more emergency contacts 280.

The safety modules 250a and 250b may be further configured to control operation of the light emitting devices 225 and display 290, respectively, in response to user input. For example, the user may change the color of light emitted by the light emitting devices 225 or display 290 as a covert signal that the user is in distress. The user may also use the color emitted by the light emitting devices 225 or display 290 as a form of identification. For example, when a user is waiting for a ride, the user may inform the driver to look for a particular color coming from the wearable mobile device. In other embodiments, drivers may be equipped with wearable mobile devices and may inform passengers to look for a driver whose device is emitting a particular color light.

As shown in FIG. 2, the connections between the wearable mobile devices 201 and 202 and the video/audio storage server 270, public safety organization(s) 275, and/or emergency contact(s) 280 may include wireless and/or wireline connections and may be direct or include one or more intervening local area networks, wide area networks, and/or the Internet. The network 260 may be a global network, such as the Internet or other publicly accessible network. Various elements of the network 260 may be interconnected by a wide area network, a local area network, an Intranet, and/or other private network, which may not be accessible by the general public. Thus, the communication network 260 may represent a combination of public and private networks or a virtual private network (VPN). The network 260 may be a wireless network, a wireline network, or may be a combination of both wireless and wireline networks.

Although FIG. 2 illustrates a communication network for facilitating communication of image information, audio information, video information, and/or text information in response to an event in accordance with some embodiments of the inventive subject matter, it will be understood that embodiments of the present invention are not limited to such configurations, but are intended to encompass any configuration capable of carrying out the operations described herein.

Figure 3:
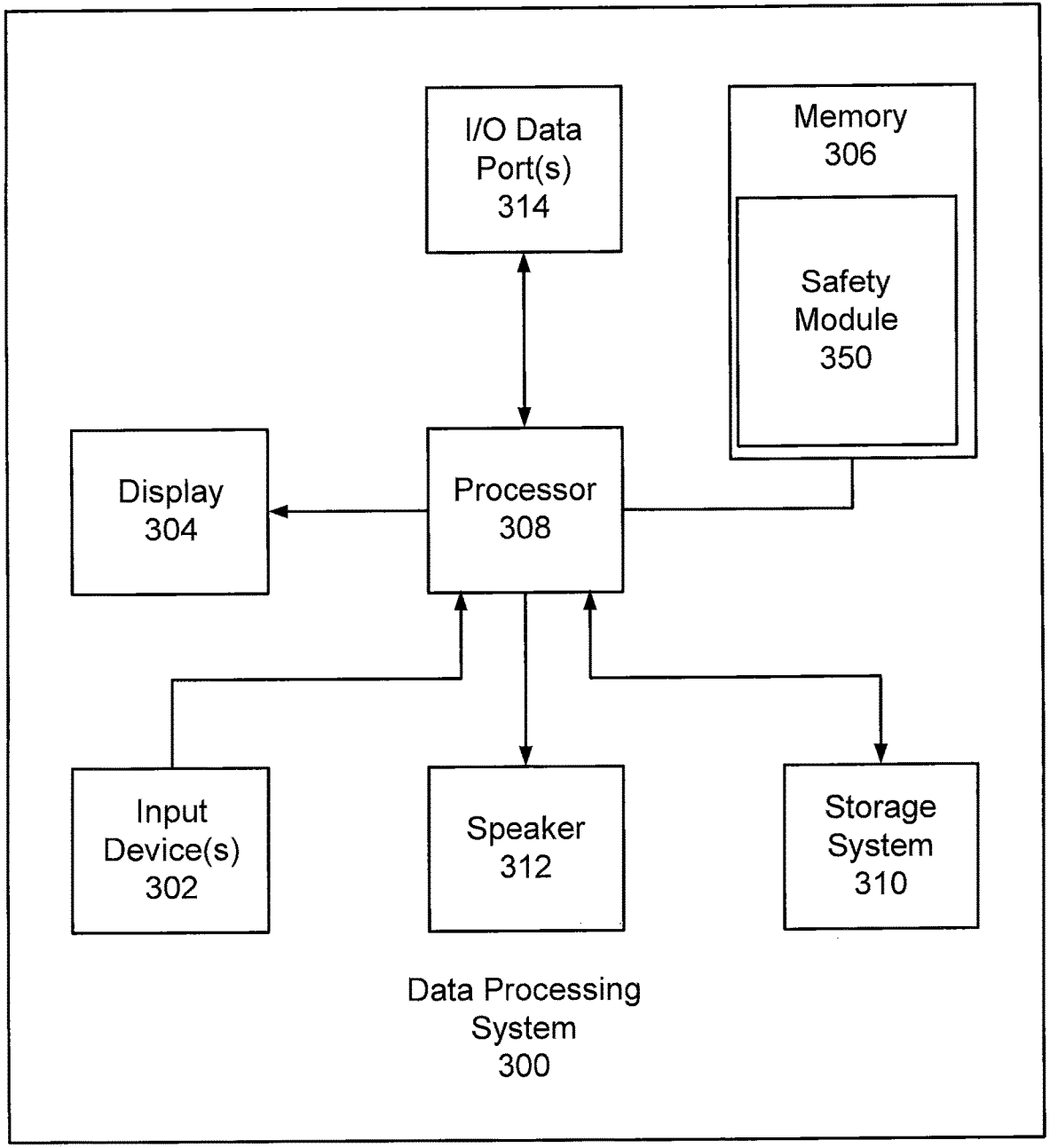
FIG. 3 illustrates a data processing system that may be used to implement the mobile device of FIG. 2 in accordance with some embodiments of the inventive subject matter.

Referring now to FIG. 3, a data processing system 300 that may be used to implement the wearable mobile devices 201, 202 of FIG. 2 and wearable mobile devices 100a, 100b, and 100c of FIGS. 1A, 1B, 1C, 1D, and 1E, in accordance with some embodiments of the inventive subject matter, comprises input device(s) 302, such as a keyboard or keypad, a display 304, and a memory 306 that communicate with a processor 308. The data processing system 300 may further include a storage system 310, a speaker 312, and an input/output (I/O) data port(s) 314 that also communicate with the processor 308. The storage system 310 may include removable and/or fixed media, such as floppy disks, ZIP drives, flash drives, USB drives, hard disks, or the like, as well as virtual storage, such as a RAMDISK or cloud storage. The I/O data port(s) 314 may be used to transfer information between the data processing system 300 and another computer system or a network (e.g., the Internet). These components may be conventional components, such as those used in many conventional computing devices, and their functionality, with respect to conventional operations, is generally known to those skilled in the art. The memory 306 may be configured with a safety module 350 that may be configured to provide the safety modules 250a and 250b of FIG. 2 according to some embodiments of the inventive subject matter.

Figure 4:
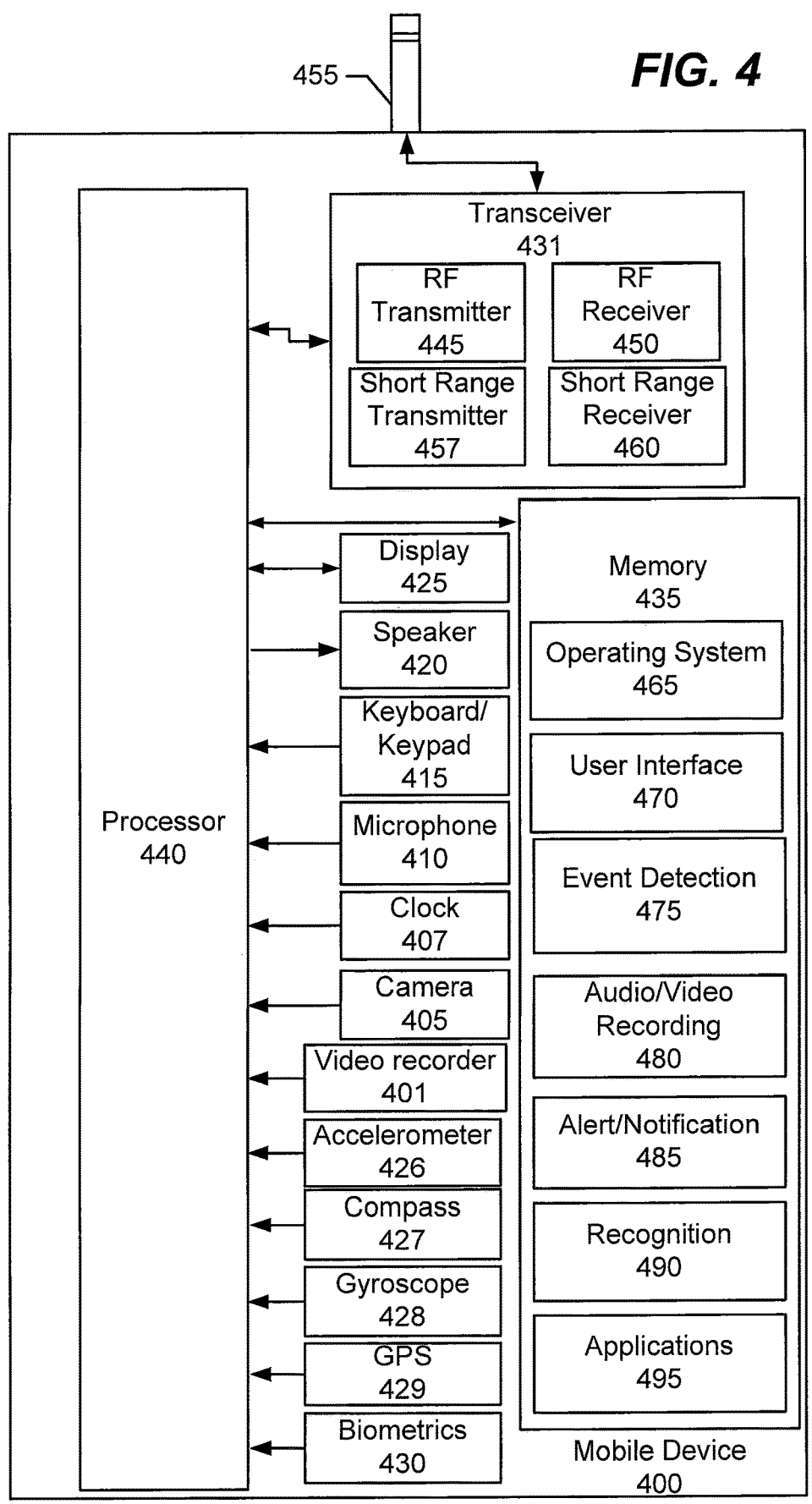
FIG. 4 is a block diagram that illustrates an electronic device/mobile device in accordance with some embodiments of the inventive subject matter.

Referring now to FIG. 4, an exemplary mobile device 400 that may be used to implement the wearable mobile devices 201 and 202 of FIG. 2 and wearable mobile devices 100a, 100b, and 100c of FIGS. 1A, 1B, 1C, 1D, and 1E, respectively, in accordance with some embodiments of the inventive subject matter, includes a video recorder 401, a camera 405, a clock 407, a microphone 410, a keyboard/keypad 415, a speaker 420, a display 425, which may be a touchscreen, a transceiver 431, and a memory 435 that communicate with a processor 440. Because of the size of the wearable mobile device in which the mobile device 400 may be deployed, the keyboard/keypad 415 and display 425 may be relatively small and the keyboard/keypad may contain one or only a few buttons as opposed to a conventional QWERKY keyboard. Moreover, wearable mobile devices may include fewer or more of these modules in accordance with various embodiments of the inventive subject matter.

The transceiver 431 may comprise a radio frequency transmitter circuit 445 and a radio frequency receiver circuit 450, which respectively transmit outgoing radio frequency signals to base station transceivers and receive incoming radio frequency signals from the base station transceivers via an antenna 455. The radio frequency signals transmitted between the mobile device 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The transceiver 431 further may further comprise a point-to-point short-range wireless transmitter circuit 457 and a point-to-point short-range wireless receiver circuit 460, which respectively transmit and receive short-range wireless signals corresponding to short range wireless technology protocols including, but not limited to, Classic Bluetooth, Bluetooth Low Energy, Wireless Local Area Network (WLAN), ZigBee, Infrared, Device to Device (D2D) cellular, Wi-Fi, and/or other short-range wireless technology protocols. The foregoing components of the mobile device 400 may be included in many conventional mobile devices and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitate communication of video and/or audio information in response to an event in accordance with some embodiments of the inventive subject matter. The memory 435 may include, but is not limited to, the following types of devices: cache, ROM, PROM, EPROM, EEPROM, flash, SRAM, and DRAM.

As shown in FIG. 4, the memory 435 may contain up to six or more categories of software and/or data: an operating system 465, a user interface module 470, an event detection module 475, an audio/video recording module 480, an alert/notification module 485, a recognition module 490, and applications 495.

The operating system 465 generally controls the operation of the mobile device 400. In particular, the operating system 465 may manage the mobile device's software and/or hardware resources and may coordinate execution of programs by the processor 440. The user interface module 470, the event detection module 475, the audio/video recording module 480, the alert/notification module 485, and the recognition module 490, in combination, may correspond to the safety modules 250a, 250b and the safety module 350 of FIGS. 2 and 3, respectively. In accordance with various embodiments of the inventive subject matter, the operating system 465 may comprise the iOS or Android operating systems.

The user interface module 470 may be configured to provide a mechanism for activating and deactivating the mobile device 400 via, for example, the keyboard/keypad 415 and also a variety of other user customizable features. In some embodiments in which the mobile device 400 provides only point-to-point short range wireless connectivity by the short range transmitter 457 and short range receiver 460 (wearable mobile device 100b of FIG. 1B), the user interface 470 may cooperate with the user interface on another device that has radio frequency cellular functionality, such as a mobile phone, laptop, tablet, or the like to establish a short-range wireless connection to that device. The cellular device may act as a conduit between the mobile device 400 and other entities, such as the video/audio storage server 270, public safety organization(s) 275, and emergency contact(s) 280 of FIG. 2. Even when mobile device 400 is equipped with radio frequency cellular technology (wearable mobile devices 100a and 100c of FIG. 1A and FIG. 1C, respectively), the user interface 470 may be used to establish a short-range wireless connection to another device, such as a mobile phone, tablet, and the like, to allow the various features of the mobile device 400 to be programmed or selected from the other device. The mobile phone, tablet, laptop, etc. may provide a larger display that is more convenient for a user to navigate. The various features of the mobile device 400 and/or wearable mobile device 100 that may be programmed may include, but are not limited to, 1) particular colors displayed by the light emitting devices 125/225 or display 160/290 during normal wear and in response to an event, 2) a clasp release mode allowing the user to disengage the clasp 115/215 or band 150 without triggering an event, 3) selection of emergency contact(s) 280 and/or public safety organization(s) to receive notifications that the user is in distress and what type of notification to transmit, e.g., SMS text message, email, audio call, video, call, or the like, 4) whether to transmit a notification and/or whether to perform a stealth alert by lighting the light emitting devices 125/225 or display 165/290, 5) identification of the video/audio storage server 270 and whether to collect video and/or audio information for an event, 6) activate acceleration and orientation analysis via data from the accelerometer 426 and/or gyroscope 428, which may assist in determining if a user has fallen or otherwise been subject to strong forces that may have left the user immobile or in danger, 7) activate option of playing an alarm or message via the speaker, 8) biometric information thresholds for biometric information received through, for example, the biometric sensor 170 and the biometrics module 430 that can be used to evaluate whether a particular biometric parameter is indicative of a health problem or emergency warranting an alert, 9) defining a bounded geographic area that can be used to monitor where a person, such as a child or elderly person, travels to trigger an alert when the person transitions from inside to outside the boundary; and/or a time duration threshold associated with obstruction or covering of the camera and/or video recorder that could be indicative of hostile action against a wearer. The user interface 470 may further provide a mechanism for a user to indicate an event is occurring through touching a key on the keyboard/keypad 415, touching the display 425, or touching some other portion of the wearable mobile device 100a, 100b, and/or 100c that is communicatively coupled to the mobile device 400.

The event detection module 475 may be configured to detect that an event has occurred that may be indicative that the user or wearer of the wearable mobile device 100a, 110b, 110c is in distress or has other safety concerns. An event may be triggered in a variety of ways in accordance with different embodiments of the inventive subject matter. For example, the user or other entity/force may press a key on the keyboard/keypad 415, press the display 425, press another portion of the wearable mobile device 100a, 100b, 100c that is communicatively coupled to the mobile device 400, and/or break the clasp 115/215 or band 150. Acceleration and/or orientation data may be generated from the accelerometer 426 and/or gyroscope 428 and then compared to normative ranges, which may indicate the user may have fallen, been impacted by a significant force, or the like. The camera 405, video recorder 401, and/or microphone 410 may also be used to monitor the surrounding environment and if a threat is detected, e.g., a person makes a threatening gesture, uses hostile words, or the like, an event may be triggered. In other embodiments, an event may be triggered when the camera 405 and/or video recorder 401 is obstructed or covered for time period that exceeds a defined threshold. This may detect, for example, a hostile party attempting to cover the camera 405 and/or video recorder 401 with a hand or other object to avoid being captured on camera and/or video. The threshold may be set to a suitable range, such as 10 seconds, for example, to avoid triggering an event for routine obstructions that may be unintentional and not indicative of an event that would justify a notification.

The audio/video recording module 480 may be configured to record audio and/or video (including graphical) information using the video recorder 401, camera 405, and/or microphone in response to an event. The user may select whether audio, video, or both are collected via the user interface 470 as described above. The audio and/or video information may be streamed to a remote video/audio storage server 270 responsive to the event where it can be stored safely even if the wearable mobile device 100a, 100b, 100c is destroyed or stolen during or subsequent to the event. That is, the audio/video information may be transmitted to the video/audio storage server without any artificial scheduling delays once the event is triggered.

The alert/notification module 485 may be configured to generate the desired notifications to the desired entities/parties based on the selections made by the user via the user interface. For example, the user may select which emergency contacts 280 and public safety organizations 275 are to receive notifications and how they should be notified, e.g., via SMS text messaging, email, audio/video call, and the like. The alert/notification module 485 may also cooperate with the compass module 427 and the GPS module 429 to provide location and/or navigation information to the emergency contact(s) 280, the public safety organization(s) 275, and/or for storage on the video/audio storage server 270. In some embodiments, the audio/video feed may also be provided to the public safety organizations 275 and/or the emergency contacts 280 to assist responders in determining where the user is located. For example, the video feed may indicate that the user has fallen in a bathroom. The light emitting devices 125/225 may also be configured to emit a particular color in response to an event instead of or in addition to the notifications and/or video/audio storage described above. When only the light emitting devices 124/225 or display 160/290 are used as an alert to an event the wearable mobile device 100 may be considered to be operating in a stealth mode in that the user may not otherwise outwardly indicate that a potentially distressing event has occurred, but confidants to the user who know the meaning associated with the particular color displayed may be summoned to come to the user's aid. The speaker 420 may also be used to transmit an alarm or message notifying in an attempt to scare a hostile party away and/or notify others in the surrounding area that the user is in distress. The light emitting devices 125/225 or display 165/290 may also be driven in a strobe pattern to actively notify others in the surrounding area that the user is in distress.

The recognition module 490 may be used to configure the light emitting devices 125/225 and/or display 160/290 to emit a particular color that may be agreed on, for example, as an indication of the user's identity. For example, a ride service may pick up a customer and inform the customer that driver will have a wearable mobile device 100 that emits the color blue. The customer can use this as an additional technique to authenticate the driver.

The applications module 495 may include various applications, such as a music application, calendar application, fitness tracking application, email application, and other applications that can be downloaded from a variety of sources.

Although FIG. 4 illustrates an exemplary software and hardware architecture that may be used for facilitating communication of image information, audio information, video information, and/or text information in response to an event according to some embodiments of the inventive subject matter, it will be understood that embodiments of the present invention are not limited to such a configuration, but are intended to encompass any configuration capable of carrying out the operations described herein.

It will be understood that the functionality of the mobile device 400 of FIG. 4 described above may be embodied entirely in the mobile device 400 and/or be embodied across multiple mobile devices and/or systems. For example, the mobile device 400 may be embodied similar to the wearable mobile device 100a or 100c of FIG. 1A and FIG. 1C, respectively, so as to encompass radio frequency cellular technology for communicating directly with one or more cellular wireless networks. The mobile device 400 may also be embodied without radio frequency cellular technology, but may include short-range wireless technology, such as Bluetooth or the like. In this case, the mobile device 400 may be linked with or communicatively coupled to a supplemental or secondary mobile device, such as a mobile phone, that provides a radio frequency cellular transceiver that can be used to communicate with one or more cellular wireless networks. This may be similar to the configuration of FIG. 1B and/or FIG. 1C in which the wearable mobile device 100b and/or 100c is communicatively coupled to the secondary or supplemental mobile device 130. In some embodiments, the safety module or safety application may be provided in the mobile device 400 that includes the event sensor or recordation modules, such as the camera 405, video recorder 401, microphone 410, clasp state detection, emergency button, and the like, and in other embodiments, the safety module or safety application may be provided in the secondary or supplemental mobile device, such as the mobile device 130. In this case, the safety module or safety application is provided in a separate device from the wearable mobile device that includes the event sensor or recordation modules or components.

Computer program code for carrying out operations of data processing systems discussed above with respect to FIGS. 1A, 1B, 1C, 1D, 1E, and 2-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the wearable mobile device 100a of FIG. 1A, wearable mobile device 100b of FIG. 1B, wearable mobile device 100c of FIGS. 1C, 1D, and 1E, wearable mobile device 201 and wearable mobile device 202 of FIG. 2, data processing system 300 of FIG. 3, and mobile device 400 of FIG. 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
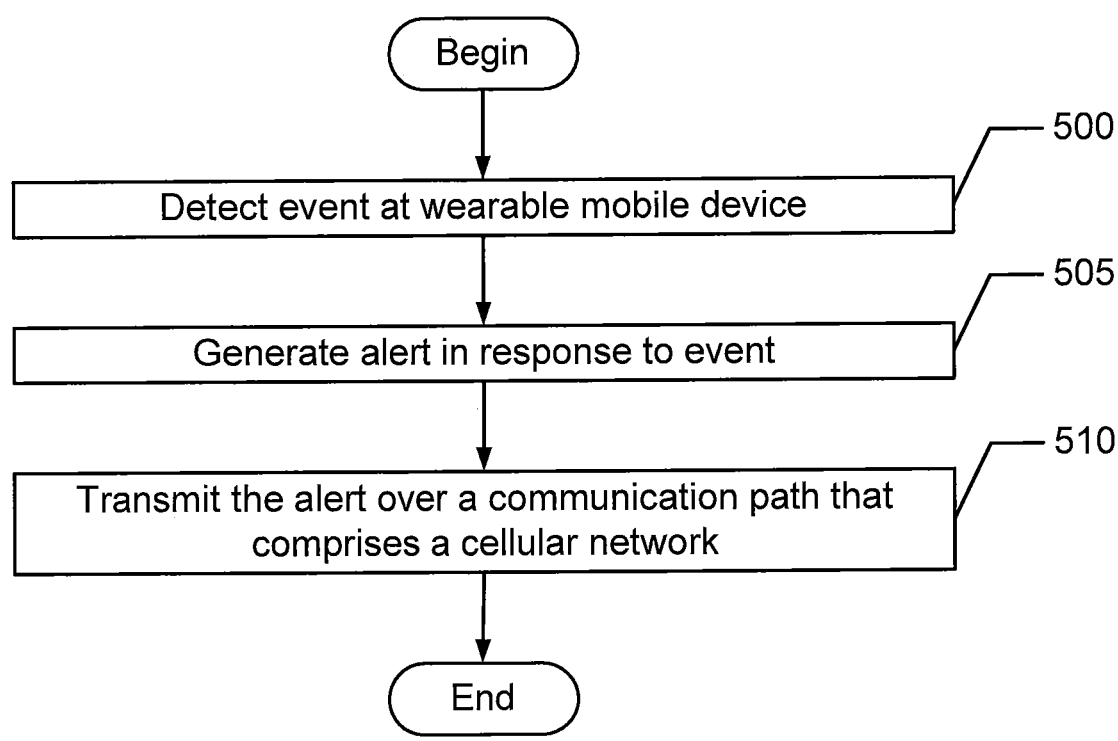
FIG. 5 is a flowchart that illustrates operations of a wearable mobile device according to some embodiments of the inventive subject matter.

FIG. 5 is a flowchart that illustrates operations of a wearable mobile device according to some embodiments of the inventive subject matter. As shown in FIG. 5, operations begin at block 500 where an event is detected at a wearable mobile device, such as the wearable mobile device 100a of FIG. 1A, wearable mobile device 100b of FIG. 1B, wearable mobile device 100c of FIGS. 1C, 1D, and 1E, wearable mobile device 201 and wearable mobile device 202 of FIG. 2. At block 505, the wearable mobile device generates an alert in response to the event. The alert is then transmitted over a communication path that comprises a cellular network at block 510.

Thus embodiments of the inventive subject matter may provide a wearable mobile device, such as a watch, necklace, bracelet, and the like, that includes a safety module/application that is embodied in the wearable mobile device in addition to a cellular radio transceiver or a capability of accessing the cellular network by way of another device. The safety module/application may incorporate both event detection via one or more sensing or recordation modules, e.g., camera, video camera, microphone, wearable device clasp, emergency button, biometric sensor, GPS unit, accelerometer, gyroscope, etc., and notification functionality. Thus, emergency contacts, including public safety organizations, family members, friends, and the like may be notified in a variety of ways based on the particular event that is detected. Moreover, the notification may be transmitted directly from the wearable mobile device over the cellular network using the cellular radio transceiver. In other embodiments, a wearable mobile device may be equipped with various sensors for detecting events, but the cellular radio transceiver functionality and/or safety module/application may be embodied in a second device, such as a cellular phone that is carried by a user. The wearable mobile device may link or connect with the cellular phone using a short-range wireless protocol, such as Bluetooth or the like. In other embodiments, event information captured by the sensing modules, such as audio recordings, video recording, images, and the like may be stored in a networked information repository, such as a cloud server, for security. A user may subscribe, for example, to a service that offers storage for the event information with pricing based on various factors, such as, but not limited to, the amount of memory consumed, whether the service forwards or makes available the event information to other entities, e.g., public safety organization(s), user contacts, and the like.

Further Definitions and Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, devices, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. It will be understood that when an element is referred to as being "connected" or "coupled" to another element or that a connection, such as a communication connection is established between two elements, it may be directly connected or coupled to the other element or intervening elements may be present. A direct coupling or connection between two elements means that no intervening elements are present. Like reference numbers signify like elements throughout the description of the figures.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

That which is claimed:

1. An electronic device, comprising:
a wearable mobile device; and
an attachment mechanism configured to facilitate carriage of the wearable device on a first person;
wherein the wearable mobile device comprises:
a processor; and
a memory coupled to the processor and comprising computer readable program code embodied in the memory that is executable by the processor to perform operations comprising:
monitoring, by the wearable mobile device, a surrounding environment of a first person wearing the wearable mobile device using at least one of a microphone or a camera included in the wearable mobile device; the surrounding environment monitored for at least one of a verbal threat or a physical threat from a second person towards the first person based on the monitored surrounding environment of the first person, wherein the monitoring of the surrounding environment of the first person is conducted by the wearable device automatically, at all times, and without input from the first person;
detecting, by the wearable mobile device, at least one of the verbal threat or the physical threat from the second person towards the first person,
wherein the verbal threat is automatically detected from audio captured by the microphone, or
wherein the physical threat is automatically detected from video captured by the camera or from an automatically detected camera obstruction when a time duration of the camera obstruction exceeds a predetermined threshold,
wherein the verbal threat or the physical threat is detected by the wearable mobile device without input from the first person;
determining, by the wearable mobile device, that the first person is in distress responsive to the detection of at least one of the verbal threat or the physical threat;
generating, by the wearable mobile device, an alert that the first person is in distress in response to determining that the first person is in distress; and
transmitting the alert that the first person is in distress from the wearable mobile device of the first person to a recipient over a communication path that comprises a cellular network, wherein transmitting the alert comprising live streaming of at least one of audio being captured by the microphone or video being captured by the camera of the wearable mobile device.

2. The electronic device of claim 1, wherein the wearable mobile device is a watch;
wherein the watch comprises a body having a slot formed in an end thereof; and
wherein the attachment mechanism comprises a band having an end that is configured to be slidably received within the slot for attachment therein.

3. A non-transitory computer readable storage medium comprising computer readable program code embodied in the medium that is executable by a processor to perform operations comprising:
monitoring, by a wearable mobile device, a surrounding environment of a first person wearing the wearable mobile device using at least one of a microphone or a camera included in the wearable mobile device, the surrounding environment monitored for at least one of a verbal threat or a physical threat from a second person towards the first person based on the monitored surrounding environment of the first person, wherein the monitoring of the surrounding environment of the first person is conducted by the wearable device automatically, at all times, and without input from the first person;
detecting, by the wearable mobile device, at least one of the verbal threat or the physical threat from the second person towards the first person,
wherein the verbal threat is automatically detected from audio captured by the microphone, or
wherein the physical threat comprises a threatening gesture by the second person toward the first person that is automatically detected from video captured by the camera or an automatically detected camera obstruction when a time duration of the camera obstruction exceeds a predetermined threshold, and wherein the verbal threat or the physical threat is detected by the wearable mobile device without input from the first person;

determining, by the wearable mobile device, that the first person is in distress responsive to the detection of at least one of the verbal threat or the physical threat;

generating, by the wearable mobile device, an alert that the first person is in distress in response to determining that the first person is in distress; and transmitting the alert that the first person is in distress from the wearable mobile device of the first person to a recipient over a communication path that comprises a cellular network, wherein transmitting the alert comprising live streaming of at least one of audio being captured by the microphone or video being captured by the camera of the wearable mobile device.

* * * * *